United States Patent [19]
Krall et al.

[11] 4,004,872
[45] Jan. 25, 1977

[54] APPARATUS FOR BLOW MOLDING PLASTIC ARTICLES
[75] Inventors: Thomas J. Krall; Albert R. Uhlig, both of Toledo, Ohio
[73] Assignee: Owens-Illinois, Inc., Toledo, Ohio
[22] Filed: June 11, 1975
[21] Appl. No.: 585,933

Related U.S. Application Data
[62] Division of Ser. No. 461,286, April 16, 1974, abandoned.

[52] U.S. Cl. .................. 425/326 B; 425/DIG. 204; 425/DIG. 211; 425/DIG. 213; 425/DIG. 215
[51] Int. Cl.² .......................................... B29C 17/67
[58] Field of Search ... 425/342, DIG. 204, DIG. 211, 425/DIG. 213, DIG. 215, 326 B, 387 B

[56] References Cited
UNITED STATES PATENTS

| | | | |
|---|---|---|---|
| 2,715,751 | 8/1955 | Weber | 264/97 X |
| 3,767,747 | 10/1973 | Uhlig | 264/98 X |

*Primary Examiner*—Richard B. Lazarus
*Attorney, Agent, or Firm*—Richard D. Heberling; E. J. Holler

[57] ABSTRACT

A method of and apparatus for blow molding a plastic article by forming a parison into a blown pre-form and then blowing the pre-form into the final article. The final blow mold is fixed, and the pre-form mold is movable from a parison-forming location to a pre-form blowing location. An arcuately movable turret carries a plurality of blow tubes sequentially registerable with the pre-form blowing location and the final blow mold location, these tubes are utilized for the blowing operation and also transfer the preform to the final mold location. The turret thus traverses the two blowing locations, but not the parison-forming location. The turret may also traverse additional thermal conditioning or ejection stations, or the like, if desired. The turret may also move vertically for mold clearance, if necessary. The turret can oscillate between the two blow mold stations or can rotate through a complete 360° traverse, as required by the number of indexing positions desired. Novel mechanism is provided to supply blow air to the blow tubes at each of the blowing locations.

9 Claims, 7 Drawing Figures

APPARATUS FOR BLOW MOLDING PLASTIC ARTICLES

This is a division of application Ser. No. 461,286, filed Apr. 16, 1974 and now abandoned.

BACKGROUND OF THE INVENTION

In the earlier U.S. Pat. of Albert R. Uhlig, No. 3,767,747, there has been proposed a method of blow molding plastic articles by means of a two-step blowing operation. By this earlier invention, a parison is blown into a pre-form, and then the blown pre-form is blown into a final article. This two-stage blowing operation greatly increases the efficiency of blow molding machines of conventional type, and this two-stage blowing operation also is particularly adapted to the final blowing of a bi-axially oriented article. All of these advantages of the earlier method are set forth in the above-identified Uhlig patent. However, in this earlier patent, both the pre-form blow mold and the final blow mold were shifted toward and away from the parison-forming location. The shifting of this large mold mass poses substantial machine design and construction difficulties. Such difficulties particularly were involved in the utilization of multiple cavity molds or molds for large articles, such as gallon containers.

Additionally, the earlier method and apparatus wherein both molds were shifted required the utilization of different blow pins for the two blowing operations, and there was no continuous cooling contact between a single blow pin and the finish or neck of a container, for example. Further, the method and apparatus disclosed in the earlier Uhlig patent immediately transferred the blown pre-form into the final blow mold. The blown pre-form was not cooled in the air in any intermediate station, nor during any appreciable transport time between molds.

In summary, the method and apparatus of Uhlig patent is a practical, workable method and apparatus for blow molding. However, the method and apparatus do not take the maximum advantage of the two-step blowing operation. The present invention proposes certain improved methods and apparatus for fully utilizing all of the thermal and mechanical advantages of the earlier patented concepts of Uhlig.

BRIEF SUMMARY OF THE INVENTION

In its simplest version, the present invention utilizes a turret or cross-head which is simply rotated between pre-form blowing and final blowing stations which are positioned 180° apart. The final blow mold is fixed at its station, while the pre-form blow mold is shuttled between its blowing station and a parison-forming station which is remote from the pre-form blowing station. The cross-head or turret carries a blow tube at each end thereof, these blow tubes being alternately registerable with the two stations. A mechanism is provided at each station for supplying blow air to the blow tube when it is located at that station. Thus, only the pre-form mold is movable and the movable mass of the machine is substantially reduced since the cross-head or turret carries only the blow tube and the pre-form mounted thereon. Even the blow air supply mechanisms are fixedly mounted at the two stations and are not carried by the cross-head or turret.

The thermal efficiency of the apparatus and method is also improved, since the finish of the container, for example, is in constant contact with the cooled blow tube, and the blown pre-form is transferred in the open air from the pre-form station to the final blow mold station. Since the pre-form has been partially cooled in the pre-form blowing station, it is strong enough to support its own weight, it is of reduced wall thickness and greater exposed wall area for greater cooling during transfer and the removal of neck or finish flash and tail flash also promotes the cooling efficiency.

The thermal efficiency can be further increased by utilizing a rotary turret or cross-head which is movable to additional stations including an intermediate air cooling station at which the pre-form is retained in the open air for cooling intermediate the pre-form blowing and final blowing operations.

The appreciable machine design advantages and thermal advantages of the present invention will be readily comprehended by those skilled in the art. These advantages arise from the fixing of the final blow mold, the transfer of the blown pre-form to the final mold and the blowing of the pre-form by the utilization of the same blow tube which was used in blowing the pre-form, the linear shuttling of the pre-form mold only between a remote parison-forming station and the pre-form blowing station, the transfer of the pre-form through the open air to the final blow mold, and the transfer of the minimal weight of the blow tubes and the blown pre-forms only by utilization of the turret or cross-head.

It is, therefore, an important object of the present invention to provide a novel method of and apparatus for blow molding a plastic article in two successive blowing operations with only a blown pre-form and the supporting blow tube being transferred from one mold to the other.

It is another important object of this invention to provide a method of blow molding a plastic article by initially blowing a parison into a pre-form at a pre-form blowing station and then transferring the blown pre-form to a fixed final blowing station.

A further object of this invention is the provision of a blow mold apparatus including a pre-form blow mold movable between a parison-forming station and a pre-form blowing station, a final blow station spaced from the pre-form blowing station, and an arcuately displaceable turret for transferring the pre-form from the pre-form blowing station to the final blowing station.

It is yet another, and no less important, object of the present invention to provide a method of blow molding a plastic article by linearly transferring a blowable parison from a parison-forming station to the pre-form blowing station, blowing the pre-form on a blow tube and then arcuately transferring the pre-form and the blow tube only to a final blow molding station which is fixed with relation to the pre-form blowing station.

Other and further objects of the present invention will become apparent from the following disclosure and claims.

ON THE DRAWINGS

AS SHOWN ON THE DRAWINGS

Figure 1:
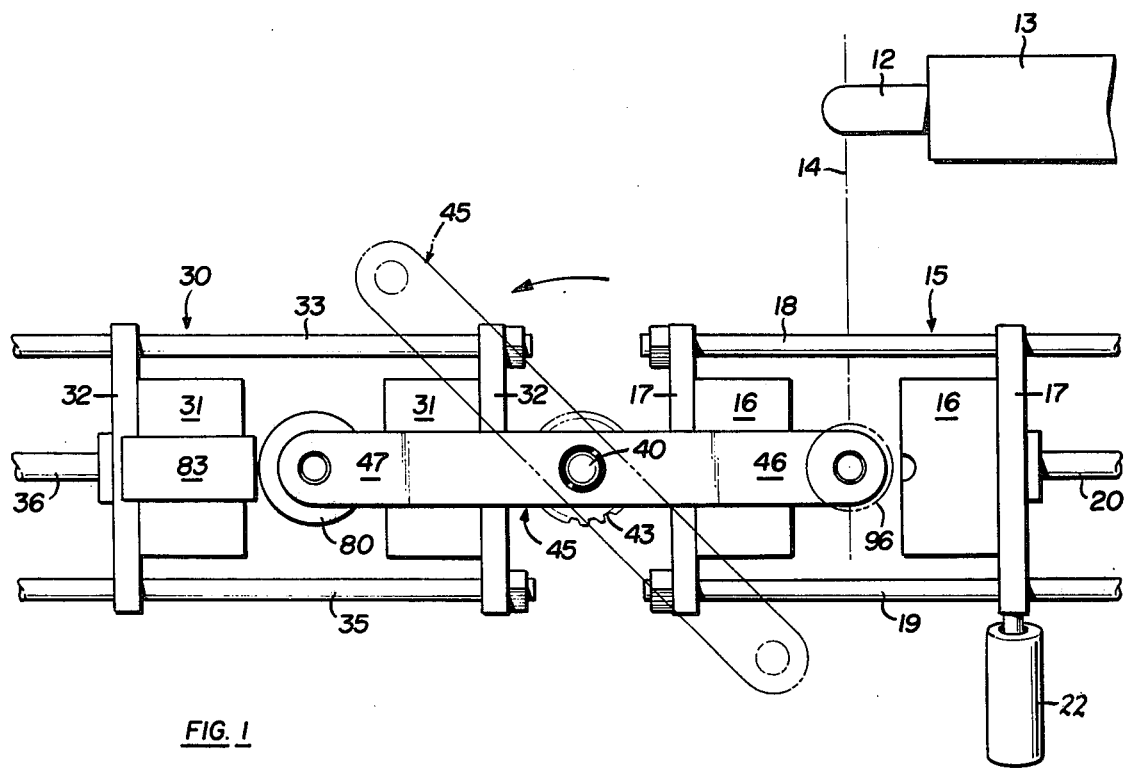
FIG. 1 is a plan view of an apparatus of the present invention capable of carrying out the method of the present invention.
Figure 3:
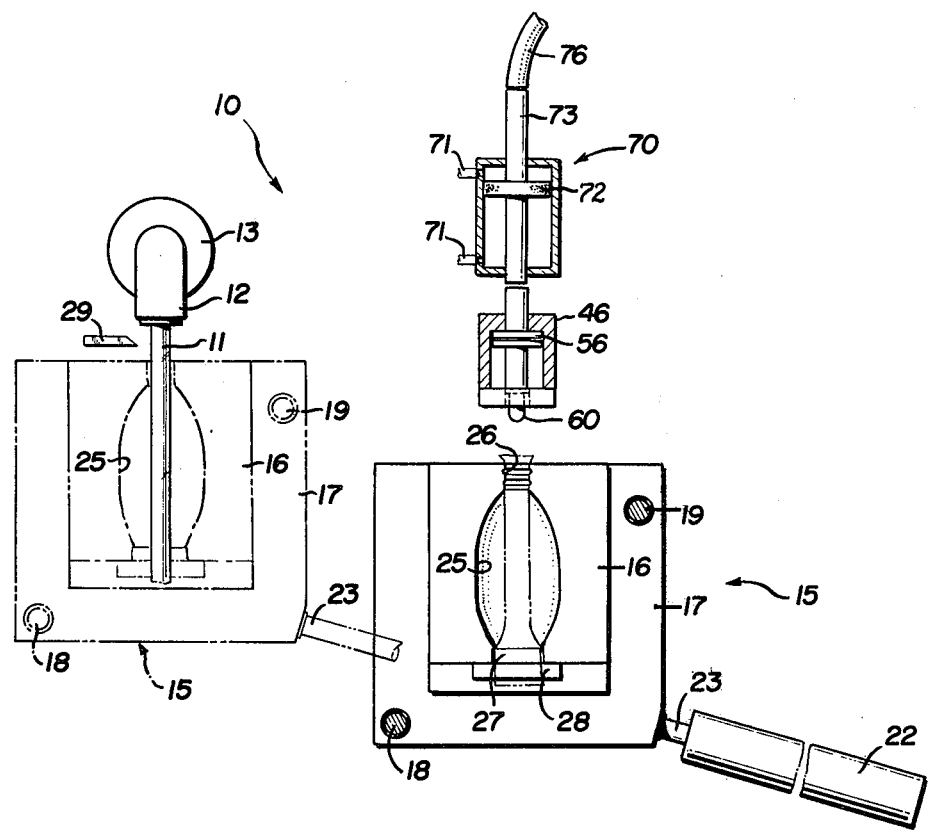
FIG. 3 is a vertical sectional view taken along the plane 3—3 of FIG. 2.

In FIGS. 1 and 3, reference numeral 10 refers generally to an apparatus of the present invention wherein a freely pendant tubular parison 11 is issued vertically downwardly from the outlet 12 of an extruder 13.

The axis of the tubular extrusion 13 is located in a vertical plane 14 which constitutes the median plane of a pre-form blow mold indicated generally at 15. This blow mold 15 comprises a pair of blow mold halves 16 closeable on a parting line lying in the plane 14. The blow mold sections 16 are each mounted on a platen 17 slidable along tie rods 18, 19 carried by the support structure (not shown), the mold sections being closeable by a piston rod 20 mounted on an actuating cylinder (also not shown).

As best illustrated in FIG. 3, the pre-form blow mold assembly 15 is mounted for linear movement in the plane 14, but in an angular upward direction toward the extruder 13. As shown in FIG. 3, an actuating cylinder 22 has its piston rod 23 connected to one of the platens 17, and extension of the piston rod 23 moves the pre-form blow mold assembly upwardly and to the left to its dotted line position in alignment with the extruded parison 11. The mold sections 16 define an interior cavity 25 having a shape intermediate the shape of the extruded parison 11 and the final article and having an upper finish portion 26, and lower "tail" or flash portions 27 removable by a pair of lower tail removal plates 28, as is well known in the art.

In operation, the open pre-form mold sections 16 are actuated by the cylinder 22 to their raised positions at which they are disposed on either side of the extruded parison 11. The pre-form blow mold sections 16 are then closed on the parison 11, the parison is severed from the extruder by a knife 29 and the parison 11 is transferred in the closed pre-form mold assembly 15 by the cylinder 22 to its lower position, as illustrated in solid lines in FIG. 3 of the drawings.

A final blow mold assembly 30 is laterally displaced from the plane 14. This final blow mold assembly includes a pair of final blow mold sections 31 each mounted on a platen 32 supported on tie rods 33, 34 for sliding movement to and from a mold closed position. The piston rod 36 of a power cylinder (not shown) actuates the final blow mold sections 31 to and from their closed positions. The final blow mold assembly 30 is fixed in its position as illustrated in FIG. 1.

Figure 2:
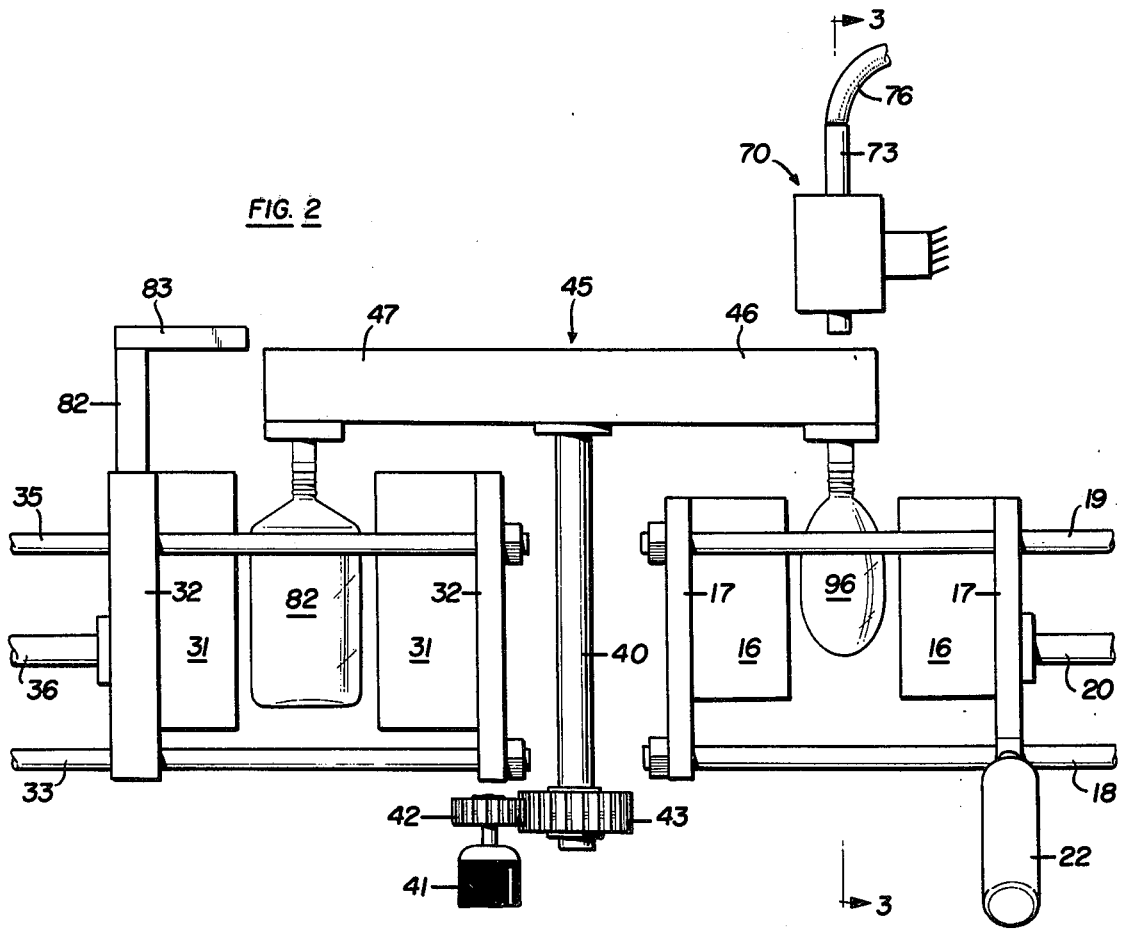
FIG. 2 is a side elevation view of the apparatus of FIG. 1.

Interposed between the pre-form blow mold assembly 15 and the final blow mold assembly 30 is a vertical actuating shaft 40 (FIG. 2) driven for arcuate swinging movement through an arc of 360° by an electric motor 41 and gears 42, 43. Surmounting the shaft 40 and secured thereto for movement therewith is a cross-head or turret 45 comprising a pair of diametrically opposed arms 46, 47 of sufficient extent radially of the shaft 46 to extend from the shaft 46 into the plane 14.

Figure 4:
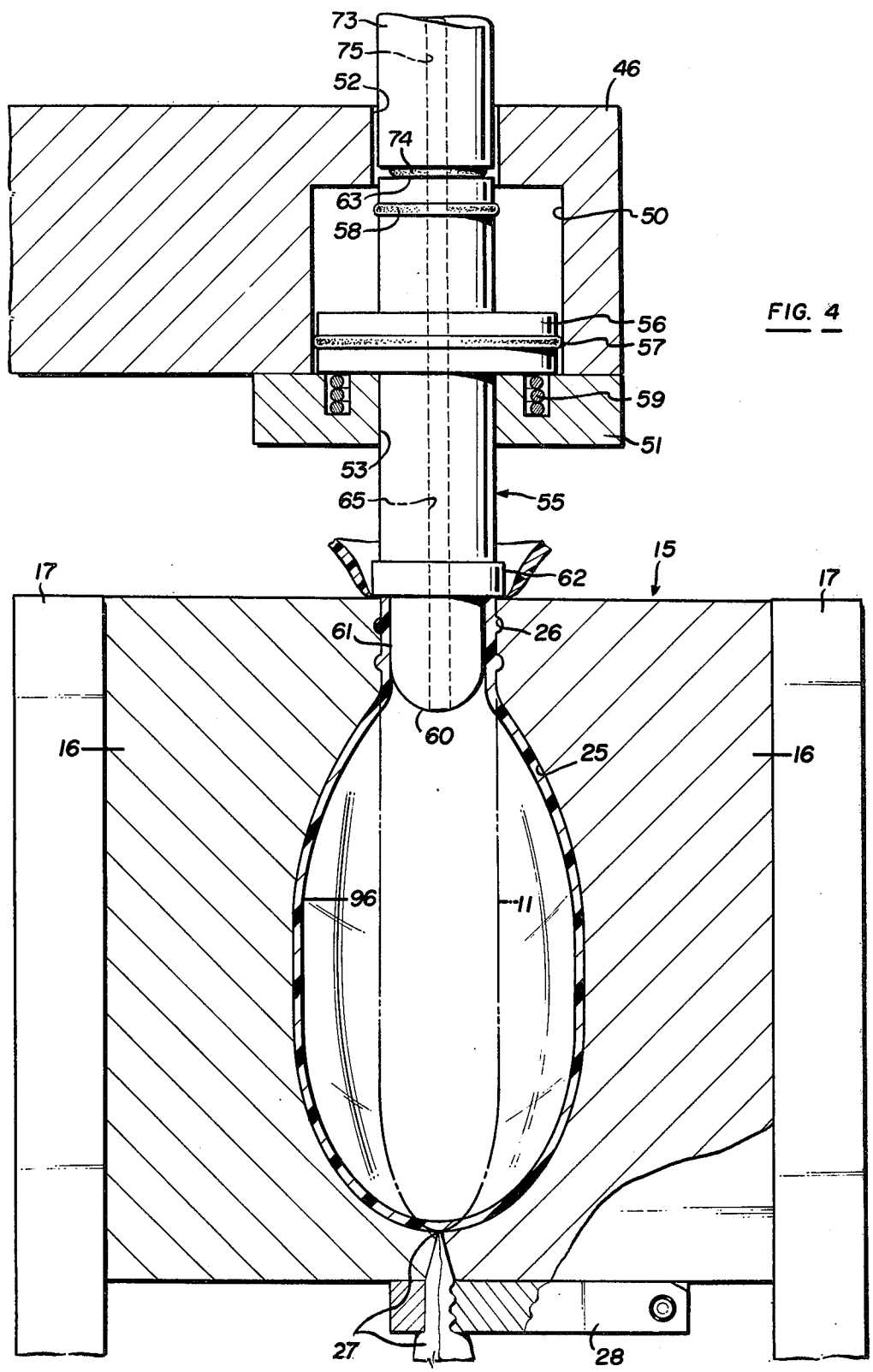
FIG. 4 is an enlarged fragmentary view similar to FIG. 3 and illustrating the apparatus in an adjusted position during the blowing of the pre-form.
Figure 5:
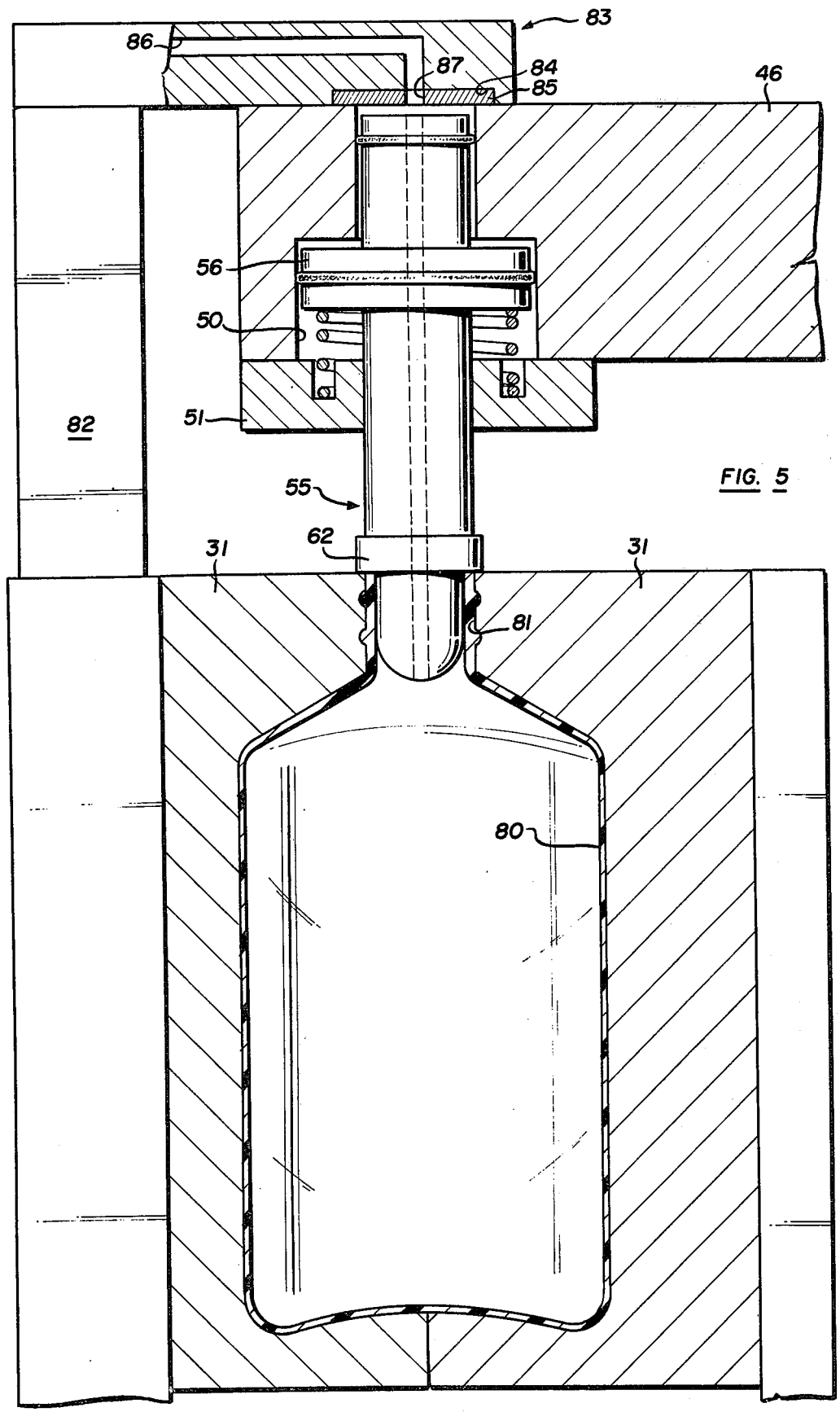
FIG. 5 is a fragmentary enlarged vertical sectional view illustrating the blowing of the final article.

As seen in FIGS. 4 and 5, each of the arms 46, 47 is provided adjacent its outer end with an open bottomed recess 50 closed at its lower end by closure plate 51. A reduced diameter opening 52 communicates through the 46 arm with the recess 50, and the plate 51 is provided with a passage 53. Extending through the openings 52, 53 is a vertically elongated blow tube indicated generally at 55, this blow tube carrying a radially enlarged piston 56 positioned in the recess 50 and appropriately sealed therein, as by seal 57. That portion of the blow tube 55 extending into the opening 52 is also sealed therein, as at 58. A spring 59 normally urges the piston 56 upwardly in the recess 50. The lower end of the blow pipe 55 is rounded, as at 60 and the blow pipe is reduced in diameter above the rounded end 60, as at 61 for entry into the parison 11.

Above the reduced portion 61, the blow pipe carries a stop collar 62 adapted to be seated on the upper surface on the mold halves 16 when the blow pipe is inserted into the parison 11 as illustrated in FIG. 4. The free upper end 63 of the blow pipe is planar and is exposed in the opening 52.

The blow pipe 55 is provided with an axial air passage 65. Axially aligned in the plane 14 and located above the pre-form blow mold 15 when it is in its retracted position of FIGS. 1 and 3 is a fluid pressure cylinder indicated generally at 70 (FIG. 3). This cylinder 70 receives fluid under pressure, either hydraulic fluid or air, through conduits 71. Interiorly of the cylinder is a piston 72 having an elongated piston rod 73 extending through each vertical extremity of the cylinder 70. The lower end of this piston rod carries an annular seal 74 (FIG. 4), and the rod is provided with an axial air passage 75. The upper extremity of the piston rod 73 is connected, as by conduit 76, to a source of air under pressure.

In operation, one of the arms 46, 47 is moved by the motor 41 and the gears 42, 43 to its solid line position of FIG. 1, so that the blow pin 55 lies in the plane 14 over the closed pre-form mold 15 having the tubular parison 11 pinched shut therein to form the blowable bubble. The free cut end of the parison 11 projects through the finish opening 26 of the closed pre-form mold 15.

Next, the cylinder 70 is actuated by fluid under pressure through the upper conduit 71 and the piston rod 73 moves downwardly into contact with the free exposed upper end 63 of the blow pin 55. Further actuation of the cylinder 70 displaces the piston rod 73 and the blow pin 55 downwardly to insert the lower end 60 of the blow pin into finish portion 63 of the mold and into the upper open end of the parison 11.

When the stop collar 62 contacts the upper surface of the pre-form blow mold 15, the motion of the blow pin stops. At this time, air is introduced through the conduit 76, the piston rod 73 and the blow pin 55 to inflate the parison 11 to the shape of the pre-form 96.

Next, the air under pressure is vented from the interior of the blown pre-form through the bores 65, 75 and the conduit 76, the tail pulling plates 28 are actuated, as is well known in the art, to remove the pinch flash or tail from the blown pre-form. Then, the pre-form blow molds are opened by the piston rod 20, and air is introduced through the lower conduit 71 to elevate the piston rod 73 from contact with the blow pin 55. The spring 59 elevates the blow pin and the blown pre-form thereon between the open sections 16 of the pre-form mold. The stop collar 62 also serves to sever excess neck flash from the blown pre-form, and this severed flash either is removed by suitable means or is simply left in place for later removal.

Next the motor 41 is actuated to turn the cross-head or turret 45 180°, thereby transferring the blown pre-form into position between the open sections 31 of the final blow mold 30. At the same time, the other arm 47 of the cross-head 45 carrying its identical blow pin 55 is moved into position over the pre-form blow mold sections 16. Now the pre-form blow mold is returned in the plane 14 to the parison-forming location under the extruder nozzle 12 for the next parison-forming operation. At about the same time, the final blow mold sections 31 are closed on the previously blown pre-form. The structure of the final blow mold is illustrated in FIG. 5 of the drawings.

It will be seen that the blow mold sections 31 enclose an interior cavity 80 conforming to the shape of the final article and having an upper finish defining portion 81. Further, the outboard final blow mold half 31 carries an upright support post 82 surmounted by an inwardly projecting arm 83. This arm is of a length to overlie the cross-head or turret arms 46, 47 when these arms are at the final blow mold station. That portion of the arm 83 which overlies the cross-head 46 is provided with an open bottomed recess 84 within which is a resilient seal pad 85 for sealing engagement with the upper surface of the arm 46. The arm 83 is also provided with a blow air passage 86 communicating with the passage 52 in the arm 46, the resilient pad 85 being apertured as at 87 to accommodate the passage of blow air therethrough. The passage 86 is connected to a source of compressed air.

Upon the introduction of fluid under pressure from a source (not shown) through the passage 86, the piston 56 is forced downwardly against the spring 59 to bottom the stop collar 62 against the top of the final blow mold sections 31.

Since the arm 83 is movable with the outboard mold section 31, cross-head 47 moves freely into and out of its final blow mold position. Upon closure of the blow mold halves 31, the arm 83 telescopes over the cross-head arm 46 into snug fitting engagement therewith. Fluid pressure in the chamber 50 after the arm 83 is in its position of FIG. 5 insures accurate positioning of the blown pre-form interiorly of the final blow mold cavity 80 and insures the production of an accurate end face on the finish or neck of the container being formed.

Following the final blow molding operation, the final blow mold halves 31 are opened, thereby returning the arm 83 to its outboard position and freeing the cross-head 45 for movement. Preferably, the bottle is removed from the blow tube 55 before the cross-head 45 is indexed to return the arm 46 to the pre-form blowing station.

From the above description, it will be seen that the present invention provides a simple, yet efficient blow molding arrangement utilizing the combination of a pre-form blow mold and a final blow mold in overlapping relationship. In other words, as a pre-form is being blown and cooled in the pre-form mold sections 16, a previously blown pre-form is being blown to its final configuration in the final blow mold sections 31. The resultant efficiency of the machine will be appreciated.

Figure 6:
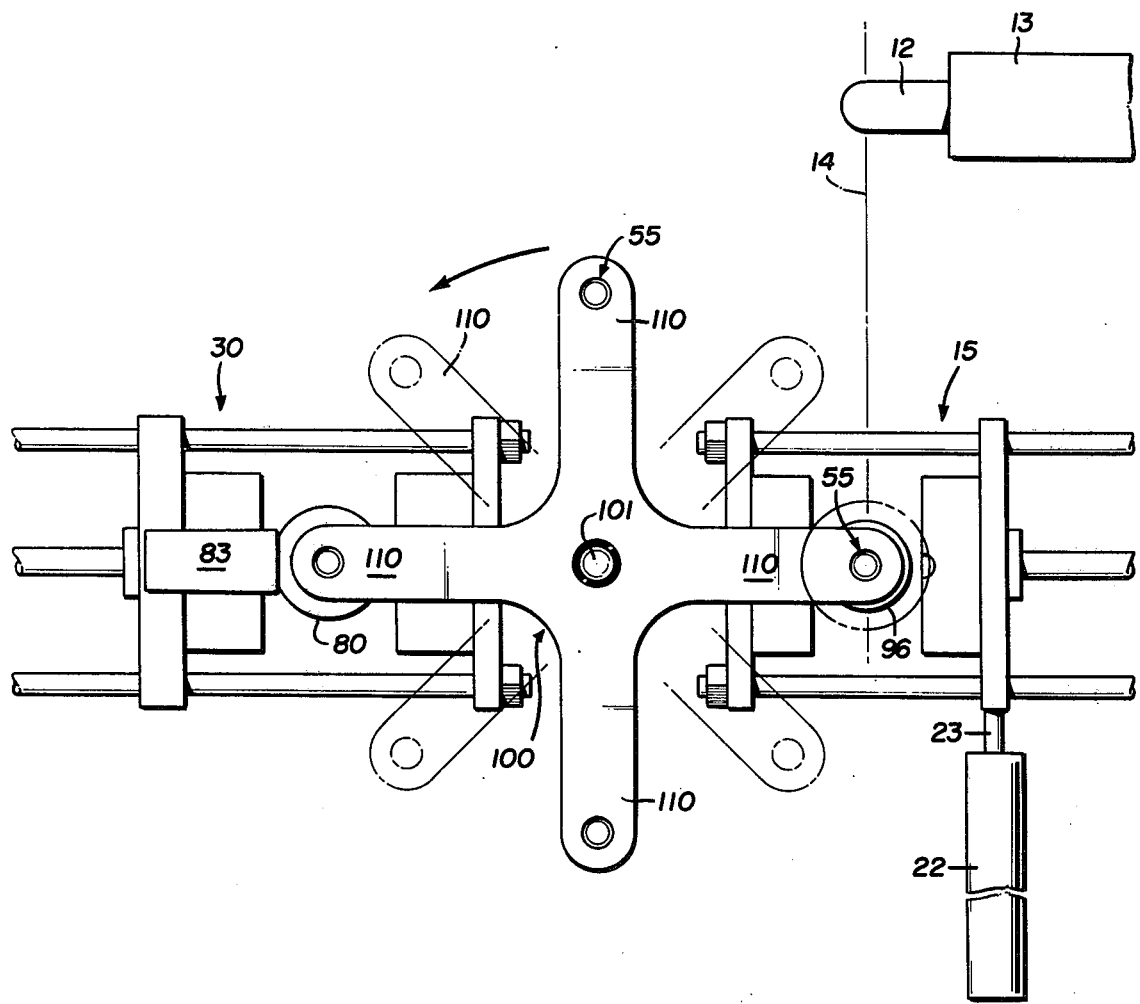
FIG. 6 is a view similar to FIG. 1 illustrating a different form of the invention.
Figure 7:
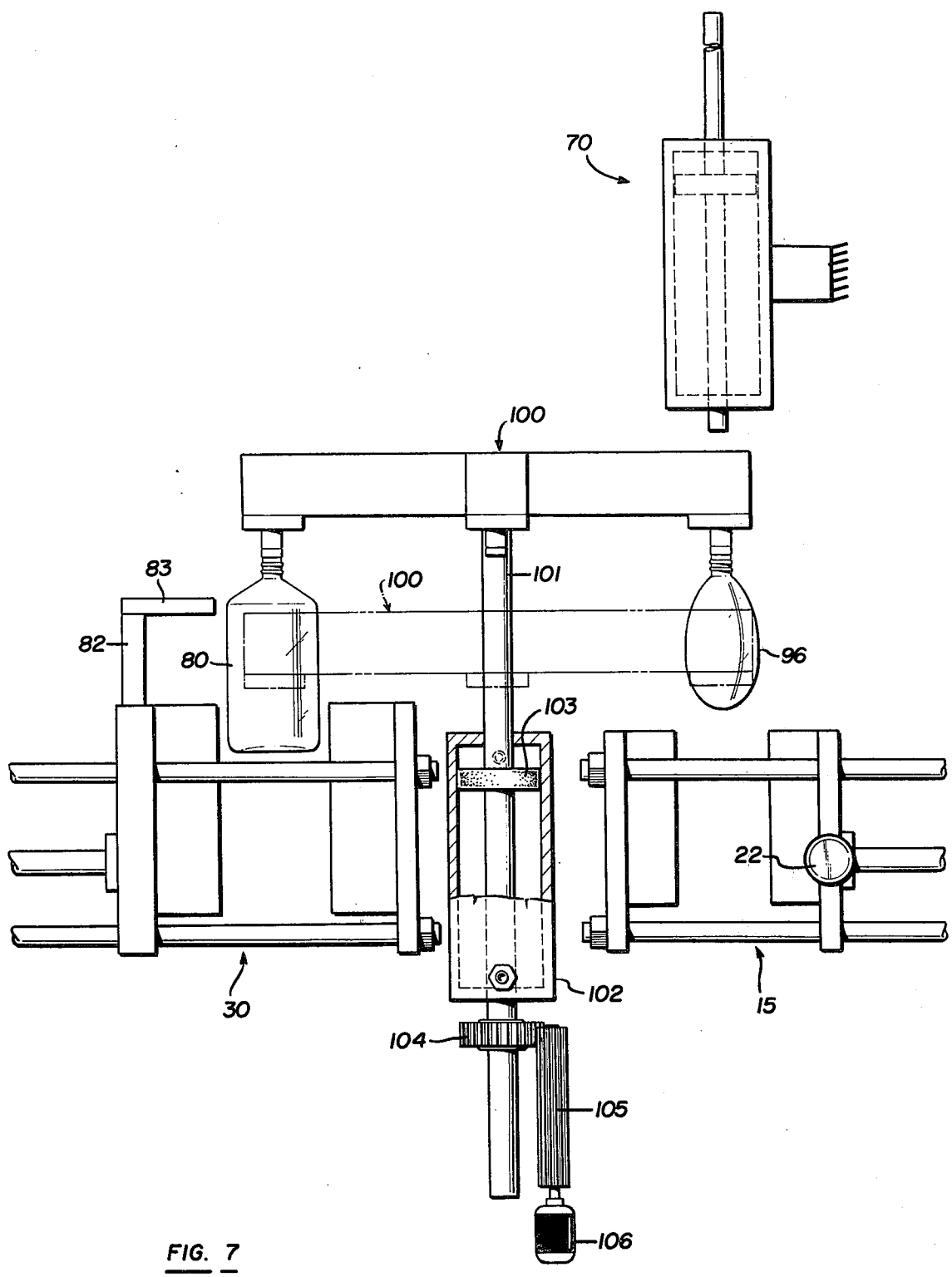
FIG. 7 is a side elevational view, with parts broken away and in sections, of the apparatus of FIG. 6.

In FIGS. 6 and 7, a machine similar to that illustrated in FIGS. 1–5 is illustrated. The machine of FIGS. 6 and 7 differs from that of FIGS. 1 through 5 in the structure of the cross-head which is indicated generally at 100. This cross-head 100 is mounted on a vertically reciprocable shaft 101 which is vertically actuated by means of a fluid pressure cylinder 102, and the shaft 101 carries a piston 103 located internally of the cylinder 102. The shaft 101 extends downwardly through the cylinder 102 and carries adjacent its lower end a drive gear 104 engageable with a drive pinion 105 driven by suitable means, as by motor 106. The drive pinion 105 is axially elongated to maintain driving relation with the gear 104 and the shaft 101 as the cylinder 102 is actuated to displace the piston 103 and the shaft 101 vertically.

As shown in FIG. 6, the cross-head 100 includes four radially extending arms 110 lying radial to the shaft 101. Each of the arms 110 carries adjacent its outer extremity a blow tube 55, such as earlier described in connection with the embodiments of FIGS. 1 through 5. As the shaft is driven rotationally, it is stopped after 90° of rotation to convey the blow pin 55 at the end of each arm through 90° of arcuate movement between dwell periods. The shaft 101 is displaced arcuately only when the shaft is in its raised position of FIG. 7. Once the arcuate movement is completed, the shaft 101 is lowered to carry out the appropriate molding operations.

The purpose of raising and lowering the shaft is to insure clearance of the blow pipes, the pre-form, and the final blown article with respect to the pre-form mold and final mold tie bars and the other structure of the machine. In some mold designs and arrangements, additional supporting structure, additional tie bars, and the like is required and the vertical movement of the shaft readily accommodates relative movement of even the final article over the tie bars 33, 35 of the final blow molds.

The purpose of the four arms and the 90° movement of the cross-head of FIGS. 6 and 7 when contrasted with two arms and the 180° arcuate movement of the embodiment of FIGS. 1 through 5 allows the positioning of a thermal conditioning station intermediate the pre-form blow station and the final blow station. In other words, the pre-form blown in the mold sections 16 of FIG. 6 is transferred to an intermediate station at which the pre-form can be cooled or heated so that the pre-form is at precisely the desired orientation temperature, for example, before the pre-form is introduced into the final blow molds 31 and finally blown to the desired configuration. This thermal conditioning may simply involve allowing the blown pre-form to air cool for a period of time prior to finally blowing the blow mold. Alternatively, the pre-form can be enclosed in a heating or cooling chamber located at this second dwell station.

The finally blown article is elevated from the final blow molds 31 and is indexed to a dwell station with the final article still being supported on the blow tube assembly 55. At this station, the final article may be simply unloaded or ejected from the blow tube, or the final article may be trimmed or deflashed, it may be flame treated, or it may be decorated at this station.

Thus, it will be seen that the embodiment of FIGS. 6 and 7 is a far more versatile machine than the machine of FIGS. 1 through 5. However, both use the same arcuate transfer of a blown pre-form from a linearly displaceable pre-form blow mold to a fixed final blow mold, and the essential apparatus and method characteristics of this machine remain identical.

Now having described the presently preferred embodiment herein shown by way of example, reference should be had to the claims which follow.

We claim:

1. In an apparatus for blow molding a plastic article by successive pre-form blowing and final article blowing steps, said apparatus including a pre-form blowing station interposed between a parison extrusion station and a final blow mold station, the improvements of a pre-form blow mold linearly movable between said parison extrusion station and said pre-form blowing station, means for opening and closing said pre-form blow mold, a fixed final blow mold located at said final blowing station spaced from said pre-form blowing station, means for opening and closing the final blow mold independently of said means for opening and closing said pre-form blow mold, a rotary turret arcuately movable about an axis intermediate said pre-form blowing station and said final blowing station to transfer the blown pre-form from said pre-form blowing station to said final blowing station, means for vertically raising and lowering said turret, a blow tube carried by said rotary turret and aligned with each blowing station in sequence as the turret is indexed, and means for supplying blow air to said tube for providing a source of blow air at each mold location.

2. In an apparatus for blow molding a plastic article by successive pre-form blowing and final article blowing steps, said apparatus including a pre-form blowing station interposed between a parison extrusion station and a final blow mold station, the improvements of a pre-form blow mold movable between said parison extrusion station and said pre-form blowing station, means for opening and closing said pre-form blow mold, a fixed final blow mold located at a final blowing station spaced from said pre-form blowing station, means for opening and closing the final blow mold independently of said means for opening and closing said pre-form blow mold, a rotary carrier arm arcuately movable about an axis intermediate said pre-form blowing station and said final blowing station, to transfer the blown pre-form from said pre-form blowing station to said final blowing station, a pair of blow tubes carried by said rotary carrier arm at the extremities thereof and aligned with each blowing station in sequence as the carrier arm is indexed, and means fixed at each blowing station for introducing blow air into said blow tube.

3. In an apparatus as defined in claim 2, the further improvements of means for elevating and lowering said rotary carrier arm.

4. In a blow molding apparatus, said apparatus including a first blow mold station interposed between a parison forming station and a second blow mold station, a blow mold displaceable between said parison forming station and a first blow mold station, a source of blowing fluid at said first blow mold station and spaced vertically from said mold, a rotary turret, a blow tube carried by said turret and interposed between said blow mold and said source of blowing fluid, power means at said first blow mold station for displacing said blow tube into said blowable parison and for connecting said blow tube with said source of blowing fluid, the parison being blown in said first blow mold to a preform shape, a second blow mold fixed at said second blow mold station spaced from said first blow mold, means for actuating said turret to transfer said blow tube and the pre-form shape to said second blow mold, and means at the second blow mold station engagable with the turret for connecting the blow tube to the source of blowing fluid.

5. In an apparatus for blow molding a plastic article by successive pre-form blowing and final article blowing steps, said apparatus including a pre-form blowing station interposed between a parison extrusion station and a final blow mold station, including a sectional pre-form blow mold movable between said parison extrusion station and said pre-form blowing station, means for opening and closing the sections of said pre-form blow mold, a fixed sectional final blow mold located at said final blowing station spaced from said pre-form blowing station, means for opening and closing the sections of said final blow mold independently of said means for opening and closing said pre-form blow mold, a rotary carrier arm arcuately movable about a vertical axis intermediate said pre-form blowing station and said final blowing station, to transfer the blown pre-form from said pre-form blowing station to said final blowing station, a pair of vertical blow tubes carried by said rotary arm at the extremities thereof, said blow tubes being aligned with each blowing station in sequence as the carrier arm is indexed, each of said blow tubes having a free, exposed upper end, and means fixed at each blowing station for introducing blow air into said blow tubes through the free exposed upper ends thereof.

6. The apparatus as defined in claim 5, characterized by one of said means for introducing blow air including an arm connected to a blow mold section and being engageable with the rotary carrier arm for supplying air to the blow tubes.

7. The apparatus as defined in claim 5, characterized by one of said means for introducing blow air including a vertically reciprocable rod having a free exposed lower end engageable with the free exposed upper end of the blow tubes.

8. The apparatus as defined in claim 5, characterized by said rotary carrier arm having a pair of recesses at the extremities thereof, said blow tubes each including a piston disposed within a carrier arm recess for vertical movement therein, means in each of said recesses acting against the respective piston for biasing the associated blow tube upwardly, one of said means for introducing blow air including a vertically reciprocable rod, and power means for displacing said rod into engagement with the free upper end of the blow tube and for overcoming the resistive force of the biasing means to vertically displace the blow tube.

9. The apparatus of claim 1, wherein the improvements additionally include a thermal conditioning station intermediate the pre-form blow station and the final blow station.

* * * * *